US012749131B2

(12) United States Patent
Morgan et al.

(10) Patent No.: US 12,749,131 B2
(45) Date of Patent: Sep. 29, 2026

(54) PICKUP ORDER PROCESSING

(71) Applicant: NCR Voyix Corporation, Atlanta, GA (US)

(72) Inventors: Kip Oliver Morgan, Atlanta, GA (US); Gina Torcivia Bennett, Lawrenceville, GA (US)

(73) Assignee: NCR Voyix Corporation, Atlanta, GA (US)

( * ) Notice: Subject to any disclaimer, the term of this patent is extended or adjusted under 35 U.S.C. 154(b) by 471 days.

(21) Appl. No.: 17/977,876

(22) Filed: Oct. 31, 2022

(65) Prior Publication Data

US 2024/0144401 A1 May 2, 2024

(51) Int. Cl.
*G06Q 50/12* (2012.01)
*G06V 20/10* (2022.01)

(52) U.S. Cl.
CPC ........... *G06Q 50/12* (2013.01); *G06V 20/176* (2022.01)

(58) Field of Classification Search
CPC ...... G06Q 50/12; G06Q 20/20; G06Q 10/087; G06Q 30/0635; G06Q 30/35; G06V 20/176
USPC ........................................................... 705/15
See application file for complete search history.

(56) References Cited

U.S. PATENT DOCUMENTS

2002/0156682 A1* 10/2002 DiPietro ................ G06Q 20/20 705/16
2015/0054957 A1* 2/2015 Gross ................... G08G 1/0175 348/149
2015/0098621 A1 4/2015 Bernal et al.
2017/0323370 A1 11/2017 Burry et al.
2020/0034848 A1* 1/2020 Seo ......................... G07F 17/40

FOREIGN PATENT DOCUMENTS

KR 101767507 B1 * 8/2017
KR 102181222 11/2020

OTHER PUBLICATIONS

EP Search Report—Aug. 16, 2023.
"European Application Serial No. 22216212.5, Communication Pursuant to Article 943 EPC mailed Oct. 20, 2025", 7 pgs.
Yang, Seung Hyeog, "KR102181222B1_Machine Translation", Nov. 20, 2020, 15 pgs.

* cited by examiner

*Primary Examiner* — Ariel J Yu
*Assistant Examiner* — Denisse Y Ortiz Roman
(74) *Attorney, Agent, or Firm* — Schwegman Lundberg & Woessner, P.A.

(57) ABSTRACT

Cameras capture images of vehicles and customers in drive-through lanes of a store. The images are processed to identify a type of vehicle, if any, and determine whether a given customer is in a proper lane associated with cars or a proper lane associated with walkups or non cars. Customers in improper lanes are instructed to move to the proper lane to place an order. The images are further processed to generate a written description of the vehicle, if any, and a written description of the customer. The written description is linked to the customer's order and is accessible to store staff for verification when collecting payment for the order and when providing the ordered items to the customer.

12 Claims, 3 Drawing Sheets

PICKUP ORDER PROCESSING

BACKGROUND

Alternative means of transportation are becoming more prevalent. Scooters, e-bikes, and other personal electric vehicles (PEVs) are the main form of transportation for many. Restaurant drive-thrus do not typically accommodate this type of vehicle and lobbies are often closed during later store hours such that the only availability for customers is through car drive-throughs.

A significant portion of the population lives in urban areas and may not even own a car. For safety reasons, drive-throughs typically prohibit walk through customers, wheel-chair customers, and customers on bikes. During COVID restaurants were only allowing access to customers via their drive-throughs. This presented a significant problem for truckers who were unable to find food because their trucks could not fit through a drive-through, walk-in service was closed to the public, and the drive-throughs did not permit walkup customers for safety reasons.

SUMMARY

In various embodiments, methods and a system for pickup order processing are presented. Images of vehicles and customers are captured in drive-through lanes. A check is made to ensure the customers are in a proper lane and if not, they are instructed to move to a proper lane to place an order. The images are further processed to provide a written description of the vehicle, if any, and the customer. The written description is integrated into the order workflow for the customer order for verifying the customer when the order is picked up at a designated pickup window.

DETAILED DESCRIPTION

Figure 1:
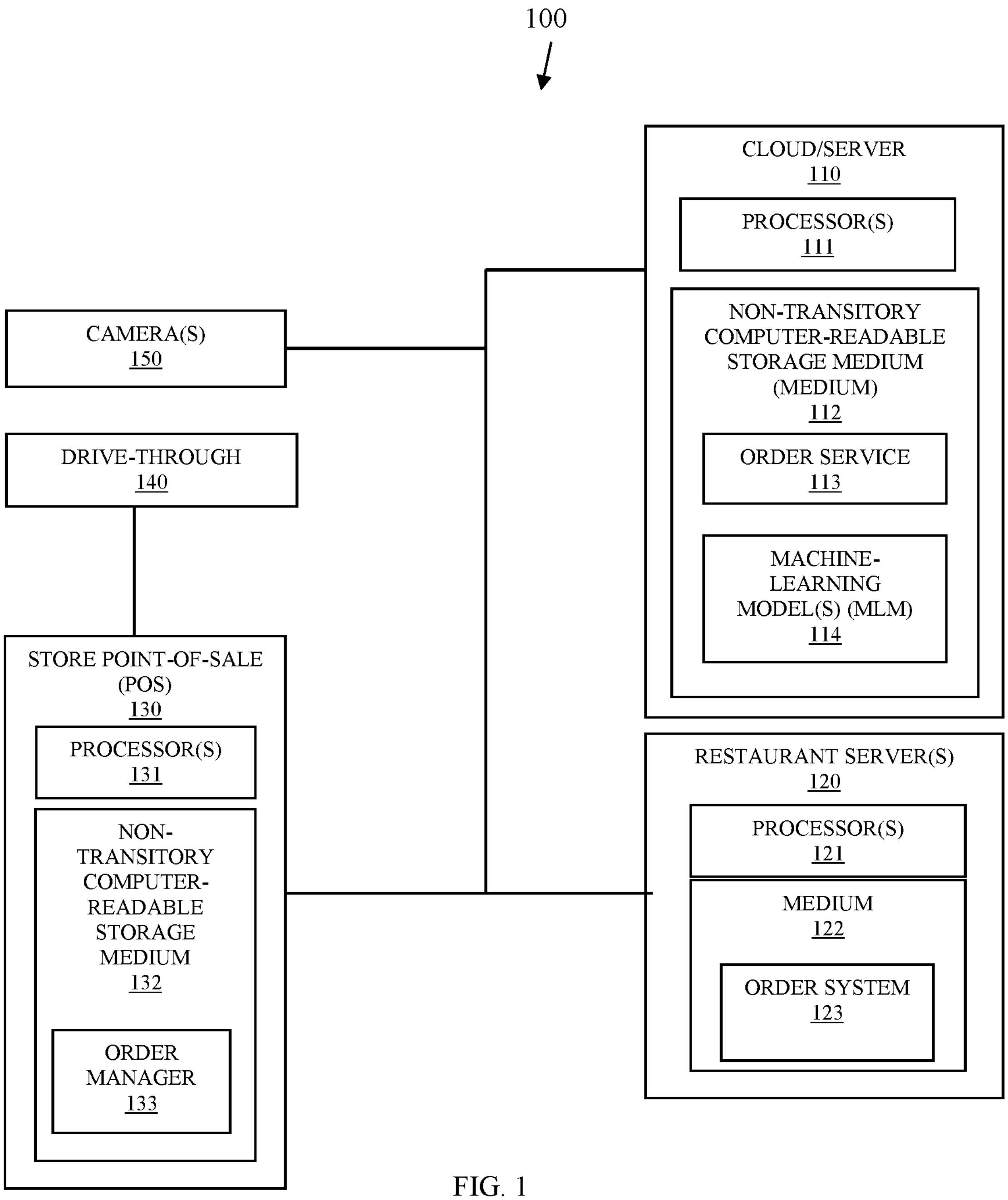
FIG. 1 is a diagram of a system for pickup order processing, according to an example embodiment.

Traditional drive-thrus include metal sensors, which are activated by motor vehicles but are not activated by bicycles and other PEVs. When the sensors are not activated, staff in the restaurant are unaware that a customer is at the drive-through desiring to place an order. As a result, the customer goes to the pay window or order fulfillment window only to turned away from services because of the restaurant's safety policies.

When the sensors are activated, assuming the drive-through includes a camera, an image of the vehicle is taken and associated with the vehicle and the order taken within the order system of the restaurant. This allows staff of the restaurant to properly associate an order with the customer in the vehicle because some fast-food restaurants can include multiple order taking drive-throughs, which do not always operate one after the other especially when an order in one of the lanes takes longer to give than an order in the other lane. To avoid charging the customers for the wrong orders and giving customers incorrect orders, the order number is usually linked to an image of the vehicle so staff at the payment window collect the correct fee for the correct order and staff at the pickup window gives the correct order to the correct customer.

Although governments and organizations are attempting to improve the climate by phasing out carbon emissions associated with vehicles that burn fossil fuels, there has been little incentive to use technology to accommodate individuals whose primary means of transportation is walking or via PEVs. A sizable population does not own a gas-powered car nor an electric car. Consumers are becoming more climate conscious and are using bikes, e-bikes, scooters, and other PEVs in larger numbers. Restaurants are potentially losing substantial revenue from this population, which was especially the case during the pandemic since truck drivers and other walk-up customers were unable to obtain in-store service.

These issues are alleviated with the teachings presented herein and below. Images are taken of drive-throughs when cars, walkup, and/or PEVs are present. The images are provided to a cloud-based order service where a trained machine-learning model (MLM) processes the image as input and produces as output the type of vehicle, if any, and a written description of the vehicle and/or the individual present at the drive-through or on the PEV. The output from the MLM can be used within a drive-through and order workflow for purposes of identifying when customers are in an improper drive-through lane of a restaurant so as to direct the customers to the proper lane and for purposes of providing descriptive written information to identify the customers and optionally their vehicles. The descriptive written information is then linked and available with the order to staff that is responsible for fulfilling the order within the restaurant.

With the teachings provided herein, restaurants can provide two separate drive-through lanes; one for cars and one for walkups bicycles, scooters, and PEVs. The actual pickup area for the walkups, bicycles, scooters, and PEVs may be through the lane that the customers ordered from or available within the store.

As used herein, a "vehicle" includes a car, a bicycle/bike, a scooter, or other PEVs. A "non-car customer" includes an individual walker, a customer on a bike, a customer on a scooter, or a customer on any PEV.

FIG. 1 is a diagram of a system 100 for pickup order processing, according to an example embodiment. The system 100 is shown schematically in greatly simplified form, with only those components relevant to understanding of one or more embodiments (represented herein) being illustrated. The various components are illustrated, and the arrangement of the components is presented for purposes of illustration only. It is to be noted that other arrangements with more or less components are possible without departing from the pickup order processing presented herein and below.

Moreover, various components are implemented as one or more software modules, which reside in non-transitory storage and/or hardware memory as executable instructions that when executed by one or more hardware processors perform the processing discussed herein and below.

System 100 includes a cloud 110 or a server 110 (hereinafter referred to as "cloud 110"), one or more restaurant servers 120, one or more point-of-sale (POS) terminals or servers 130, drive-throughs 140, and cameras 150. Cloud 110 includes at least one processor 111 and a non-transitory computer-readable storage medium (hereinafter "medium") 112, which includes executable instructions for an order service 113 and a machine-learning model (MLM) 114. The instructions when provided to processor 111 cause processor 111 to perform operations discussed herein and below for 113-114.

Each restaurant server 120 includes at least one processor 121 and medium 122, which includes executable instructions for an order system 123. The instructions when provided to processor 121 cause processor 121 to perform operations discussed herein and below for 123.

Each POS 130 comprises one or more processors 131 and medium 132, which includes executable instructions for an order manager 133. When the executable instructions are provided to processor 131, this causes processor 131 to perform operations discussed herein and below 133.

Each drive-through 140 can include a microphone, a speaker, and digital display or digital sign. Cameras 150 can be integrated into the drive-throughs 140 or can be separate standalone cameras 150 that are focused on the drive-through areas of the corresponding store.

During operation of system 100, images captured by camera 150 are made available through a common network accessible location or through direct streaming to order service 113. Order service 113 monitors the images for individuals, bicycles, cars, scooters, and other PEVs, when these objects are detected from the images. Computer vision or a MLM 114 can be trained to receive images and provide as output an identifier for an object, the object identifier associated with a car, a bicycle, a scooter, an individual walking, or PEVs. Order service 113 also assigns a drive-through lane identifier and store identifier to the corresponding image where an object was identified from the images. This can be based on a camera identifier for the corresponding camera 150, the camera identifier associated with a given store and a given drive-through lane of the store. Order service 113 uses the store identifier to identify the POS 130 of the corresponding store and sends a notification and/or a written descriptive object name and lane identifier with a time stamp to the corresponding order manager 133 in real time.

This allows order manager 133 to determine whether a customer is in a proper drive-through lane at the store and if not play an automated message through a speaker of the corresponding drive-through 140 to the customer indicating that the customer is in an incorrect drive-through lane along with instructions as to where the proper lane for placing an order is. Alternatively, order manager 133 raises an alert to staff, who operate a terminal associated with the POS 130, that instructs the staff to audibly notify the customer through a speaker of the drive-through 140 that the customer is in an incorrect drive-through lane along with audible instructions as to where the customer can find the proper drive-through lane to place an order.

In an embodiment, drive-through lane rules for the stores and their drive-throughs 140 are provided to order service 113 along with network access to the speakers associated with their drive-throughs 140. Here, order service 113 plays an audible message through the speakers informing the customers when they are not in the proper drive-through lanes along with instructions for ordering in the proper lane based on whether the customer is in a car or not in a car.

Assuming the customer is identified as being in the proper lane and the customer is not associated with a car, the image is passed to a second trained MLM 114 by order service 113 as input. The second MLM 114 is trained to provide written descriptive information for bikes, scooters, and PEVs along with written descriptive information of the customers. In an embodiment, the object type determined above as a car, bike, scooter, PEV, or walkup individual may be provided as input with the image to the second MLM 114. This allows for more focused training of the second MLM 114 to provide more fine-grain written descriptive output of the vehicle, if any, and the customer from the image by using an already determined object type, which was determined by the first MLM 114.

Order service 113 sends the lane identifier, the image, and the written description of the vehicle, if any, and the customer back to order manager 133. Order manager 133 links it to a current order being taking by staff at the store for the corresponding lane. Thus, the workflow associated with the order taken by the staff includes the image and written description. This allows the pay window and pickup window associated with the lane to identify the proper order to obtain the proper payment from the customer and to deliver the proper ordered items for the order to the customer.

In an embodiment, order service 113 indirectly interacts with the order managers 133 associated with the POSs 130 through the corresponding order systems 123 of the corresponding restaurant servers 120. Here, order service sends the object type identified, the store identifier for the store, the lane identifier for the drive-through lane, and the written description of the vehicle, if any, and the customer to order system 123 along with a time stamp. Order system 123 provided to the corresponding order manager 133 and integrates it into the order workflow for an order of a customer at a given store.

In an embodiment, a given store may include two drive-throughs 140 one for cars and one for non-cars but may only include a single drive-through pickup window. In these cases, order manager 133 instructs the customer to wait until called to come in, and pickup their order. The customer may be instructed to wait in a designated outside area where a speaker is available for staff to indicate when the non-car orders are ready for pickup. Alternatively, a separate pickup window that is not in the road around the store can be established by the store where the customer is instructed to come to pickup their order. The staff providing the order uses the linked written description of the customer to properly match the customer to their order.

In an embodiment, the written description produced by the second MLM 114 can include type and color of clothing, estimated height of the customer, any eyeglasses, etc. The written description can also estimate an age of the individual.

In an embodiment, order service 113 and MLM(s) 114 are provided through restaurant server 120. In an embodiment, order service 113 and MLM(s) 114 are provided onsite on a POS server 130 of a given store/restaurant.

System 100 permits stores or restaurants to establish at least two outdoor drive-throughs 140 for taking customer orders. Images captured by cameras 150 permit rapid identification as to whether for safety reasons a given customer is in a proper order lane and if not, the customer is notified to move to the proper lane. The images are also processed by a MLM 114 to obtain a written description of the customer's vehicle, if any, and a written description of the customer. The written description is linked to the order number of the customer by the corresponding order number, which permits staff at a pickup window and/or payment window to properly identify and provided the customer the proper ordered items.

System 100 can be integrated into existing car-based drive-throughs 140 by simply adding a camera 150 or by providing access to order service 113 to images of any existing cameras 150. The object identification and the written description of a customer's vehicle, if any, and a written description of the customer can be provided through an application programming interface (API) and integrated into existing order workflows associated with order manager 133 and/or order system 123 to receive the object identification, lane identifier, and written description from order service 113.

Figure 2:
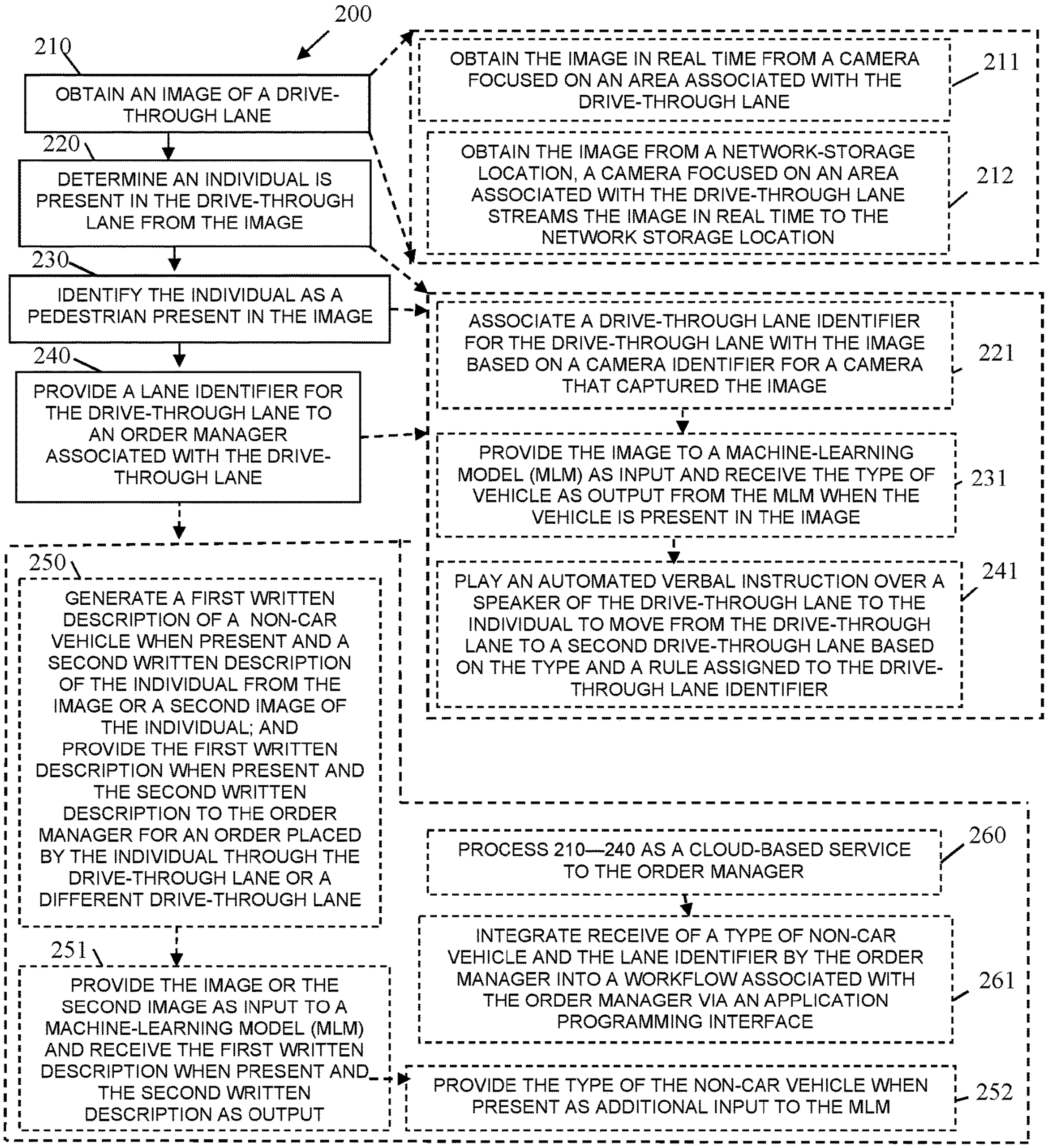
FIG. 2 is a diagram of a method for pickup order processing, according to an example embodiment.

The embodiments of FIG. 1 and other embodiments are now discussed with reference to the FIGS. 2 and 3. FIG. 2 is a diagram of a method 200 for pickup order processing, according to an example embodiment. The software module(s) that implements the method 200 is referred to as a "cloud-based drive-through order service." The cloud-based drive-through order service is implemented as executable instructions programmed and residing within memory and/or a non-transitory computer-readable (processor-readable) storage medium and executed by a plurality of hardware processors of a plurality of hardware computing devices. The processors of the devices that execute the cloud-based drive-through order service are specifically configured and programmed to process the cloud-based drive-through order service. The cloud-based drive-through order service has access to one or more networks during its processing. The networks can be wired, wireless, or a combination of wired and wireless.

In an embodiment, the device that executes the cloud-based drive-through order service is cloud 110 or server 110. In an embodiment, the device that executes the cloud-based drive-through order service is restaurant server 120. In an embodiment, the device that executes the cloud-based drive-through order service is a POS server 130 or a POS terminal of a given restaurant. In an embodiment, the cloud-based drive-through order service is order service 113 and/or MLMs 114.

At 210, the cloud-based drive-through order service obtains an image of a drive-through lane. The image can be obtained or received in a variety of manners.

In an embodiment, at 211, the cloud-based drive-through order service obtains the image in real time from a camera focused on an area associated with the drive-through lane. In an embodiment, at 212, the cloud-based drive-through order service obtains the image from a network-storage location. A camera focused on an area associated with the drive-through lane streams the image in real time to the network storage location.

At 220, the cloud-based drive-through order service determines an individual is present in the drive-through lane from the image. This can be done in addition to any car-based metal detection mechanism used with a conventional car drive-through lane using a camera focused on the drive-through area.

In an embodiment, at 221, the cloud-based drive-through order service associated a drive-through a drive-through lane identifier for the drive-through lane with the image. This is based on a camera identifier for a camera that captured the image.

At 230, the cloud-based drive-through order service identifies a the individual as a pedestrian present within the image. That is, the individual may be walking and have no vehicle. When a vehicle is present it can be identified as a car (gas or electric), a bike, a scooter, or any other PEV.

In an embodiment of 221 and 230, at 231, the cloud-based drive-through order service provides the image to a MLM 114 as input and receives as output from the MLM 114 the type of vehicle. It is noted that when a vehicle is not present the MLM may return a reserved type that indicates no vehicle was detected.

At 240, the cloud-based drive-through order service provides a lane identifier for the drive-through lane to an order manager 133 associated with the drive-through lane. In an embodiment of 231 and 240, at 241, the cloud-based drive-through order service plays an automated verbal instruction over a speaker of the drive-through lane to the individual that instructs the individual to move from the drive-through lane to a second drive-through lane based on the type and a rule assigned to the drive-through lane identifier maintained by the cloud-based drive-through order service.

In an embodiment, at 250, the cloud-based drive-through order service generates a first written description of a non-car vehicle, if any, and a second written description of the individual from the image or from a second image of the individual. The cloud-based drive-through order service provides the first written description when present and the second written description to the order manager 133 for an order placed by the individual through the drive-through lane or thru a different drive-through lane. That is, in some cases the individual in the first image may be in the incorrect lane such that the individual moves to a proper lane where a second image is taken.

In an embodiment of 250 and at 251, the cloud-based drive-through order service provides the image or the second image as input to a MLM 114 and receives the first written description when the non-car vehicle is present and the second written description as output from the MLM 114. In an embodiment of 251 and at 252, the cloud-based drive-through order service provides the type of non-car vehicle when present as additional input to the MLM 114.

In an embodiment, at 260, the cloud-based drive-through order service (210-240) is processed as a cloud-based service to the order manager 133. In an embodiment of 260 and at 261, the cloud-based drive-through order service integrates receiving of a type of vehicle and the lane identifier by the order manager 133 into a workflow associated with the order manager 133 through an API.

Figure 3:
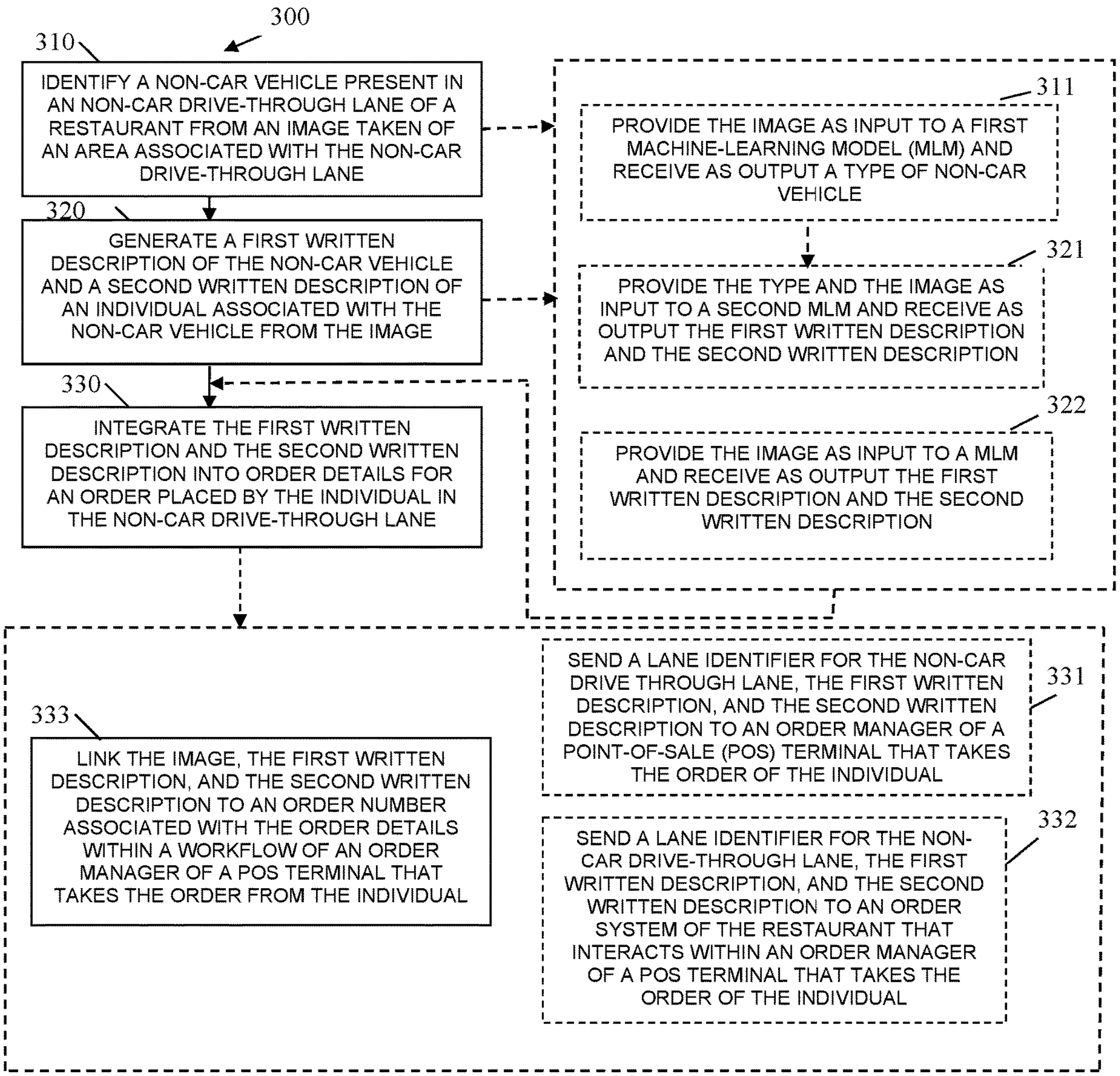
FIG. 3 is a diagram of another method for pickup order processing, according to an example embodiment.

FIG. 3 is a diagram of another method 300 for pickup order processing, according to an example embodiment. The software module(s) that implements the method 300 is referred to as an "order assistance manager." The order assistance manager is implemented as executable instructions programmed and residing within memory and/or a non-transitory computer-readable (processor-readable) storage medium and executed by one or more hardware processors of one or more hardware devices. The processors of the devices that execute the order assistance manager are specifically configured and programmed to process the order assistance manager. The order assistance manager has access to one or more networks during its processing. The networks can be wired, wireless, or a combination of wired and wireless.

In an embodiment, the device that executes the order assistance manager is cloud 110 or server 110. In an embodiment, the device that executes the order assistance manager is restaurant server 120. In an embodiment, the device that executes the order assistance manager is a POS server 130 or a POS device/terminal onsite at a given store/restaurant.

In an embodiment, the order assistance manager is all or any combination of order service 113, MLM(s) 114, and/or method 200. The order assistance manager presents another and, in some ways, an enhanced processing perspective from that which was discussed above with respect to system 100 and method 200.

At 310, the order assistance manager identifies a non-car vehicle present in a non-car drive-through lane of a restaurant from an image taken of an area associated with the non-car drive-through lane. The order assistance manager initiates after an individual in a non-car vehicle is identified from the image in the non-car drive-through lane.

In an embodiment, at 311, the order assistance manager provides the image as input to a first MLM 114 and receives as output a type of non-car vehicle. The first MLM 114 trained to recognize from images non-car vehicles and provide their types as output.

At 320, the order assistance manager generates a first written description of the non-car vehicle and a second written description of an individual associated with the non-car vehicle from the image. The first written description may include the type of non-car vehicle and its color; the second written description may include a coarse-grain description of the individual such as height, color of clothing, any hat, and glasses, etc.

In an embodiment of 311 and 320, at 321, the order assistance manager provides the type of the non-car vehicle and the image as input to a second MLM 114 and receives as output the first written description and the second written description. In an embodiment, the second MLM 114 may be processed from a remote server as an artificial intelligence (AI) image-to-text service to obtain the first and second written descriptions.

In an embodiment, at 322, the order assistance manager provides the image as input to a MLM 114 and receives as output the first written description and the second written description. So, 2 MLMs 114 can be used in embodiments 311 and 321 whereas just 1 MLM 114 is used in the embodiment of 322.

At 330, the order assistance manager integrates the first written description and the second written description into order details for an order placed by the individual in the non-car drive-through lane. This integration can occur in a variety of manners.

In an embodiment, at 331, the order assistance manager sends a lane identifier for the non-car drive-through lane, the first written description, and the second written description to an order manager 133. The order manager 133 executes on a POS terminal 130 or a POS server 130 that takes the order of the individual.

In an embodiment, at 332, the order assistance manager sends a lane identifier for the non-car drive-through lane, the first written description, and the second written description to an order system 123 of a restaurant server 120 that interacts with an order manager 133. The order manager 133 executes on a POS terminal 130 or a POS server 130 that takes the order of the individual.

In an embodiment, at 33, the order assistance manager links the first written description and the second written description to an order number associated with the order details within a workflow of an order manager 133. The order manager 133 executes on a POS terminal 130 or a POS server 130 that takes the order of the individual.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method performed by a cloud-based order service comprising at least one processor, the method comprising:

obtaining an image of at least one drive-through lane from a camera communicatively coupled to the cloud-based order service to overcome limitations of metal sensors that are not activated by bicycles or other personal electronic vehicles (PEVs);

determining, by the cloud-based order service, an individual is present in a first drive-through lane from the image;

identifying, by the cloud-based order service, the individual as a pedestrian that is present in the image;

providing, from the cloud-based order service, a drive-through lane identifier for the first drive-through lane to an order manager of a point-of-sale terminal associated with the at least one drive-through lane;

generating, by the cloud-based order service, a first written description of a non-car vehicle when present and a second written description of the individual from the image of the individual using a trained machine-learning model (MLM) that is executed by at least one server, the trained MLM processes the image as input and produces as output a type of vehicle when the non-car vehicle is depicted in the image, the first written description when the non-car vehicle is present and the second written description to properly associate an order with the individual and enable automated real-time customer identification;

integrating, by the cloud-based order service, the image, the first written description when present and the second written description via a network communication into order details associated with the order, wherein the order is placed by the individual through the first drive-through lane or a second drive-through lane, wherein the at least one drive-through lane comprises the first drive-through lane and the second drive-through lane;

linking the image, the first written description, and the second written description to an order number associated with the order details within a workflow of the order manager of a point-of-sale terminal that takes the order from the individual by sending the first written description when present and the second written description to the point-of-sale terminal; and verifying at a pickup window and payment window the individual with proper ordered items based on the image, the order details, the first written description when present and the second written description.

2. The method of claim 1, wherein obtaining further includes obtaining the image in real time from a camera focused on an area associated with the at least one drive-through lane.

3. The method of claim 1, wherein obtaining the image further includes obtaining the image from a network storage location, wherein a camera is focused on an area associated with the at least one drive-through lane and streams the image in real time to the network storage location.

4. The method of claim 1, wherein determining further includes associating a drive-through lane identifier with the image based on a camera identifier for a camera that captured the image.

5. The method of claim 4, wherein providing further includes playing an automated verbal instruction to the individual to move from the first drive-through lane to the second drive-through lane based on the type of the vehicle and a rule assigned to the drive-through lane identifier.

6. The method of claim 1 further comprising, processing the method as a cloud-based service to the order manager.

7. A method performed by a cloud-based order service comprising at least one processor, the method comprising:

identifying, by the cloud-based order service, a non-car vehicle present in a non-car drive-through lane of a restaurant from an image received via a network from a camera located at the non-car drive-through lane and the image taken of an area associated with the non-car drive-through lane to overcome limitations of metal sensors that are not activated by bicycles and other personal electric vehicles (PEVs);

generating, by the cloud-based order service, a first written description of the non-car vehicle and a second written description of an individual associated with the non-car vehicle from the image using a trained machine-learning model (MLM) that is executed by at least one server, the trained MLM is trained to provide written descriptive information for bikes, scooters, PEVs, or customers who are riding the bikes, scooters, or the PEVs to properly associate an order with the individual and enable automated real-time customer identification where metal sensor technology fails;

integrating, by the cloud-based order service, the first written description and the second written description into order details associated with the order placed by the individual in the non-car drive-through lane;

linking the image, the first written description, and the second written description to an order number associated with the order details within a workflow of an order manager of a point-of-sale terminal that takes the order from the individual; and verifying at a pickup window and payment window the individual with proper ordered items based on the image, the order details, the first written description and the second written description.

8. The method of claim 7, wherein identifying further includes providing the image as input to the trained MLM and receiving as output a type of non-car vehicle.

9. The method of claim 8, wherein generating further includes providing the type of non-car vehicle and the image as input to a second MLM and receiving as output the first written description and the second written description.

10. The method of claim 7, wherein integrating further includes sending a drive-through lane identifier for the non-car drive-through lane, the first written description, and the second written description to an order manager of the point-of-sale terminal that takes the order from the individual.

11. The method of claim 7, wherein integrating further includes sending a drive-through lane identifier for the non-car drive-through lane, the first written description, and the second written description to an order system of the restaurant that interacts with an order manager of the point-of-sale terminal that takes the order from the individual.

12. A system comprising:

at least one server that comprises at least one processor and a communication interface for network communication with a camera and a point-of-sale terminal; and the at least one processor executes instructions that cause the at least one processor to perform operations comprising:

verifying, by the at least one processor, from at least one image received via the communication interface from the camera that an individual is in a drive-through lane for placing an order to overcome limitations of metal sensors that are not activated by bicycles and other personal electric vehicles (PEVs);

causing the individual to receive an audible verbal instruction to move from the drive-through lane to a non-car drive-through lane based on the verifying by transmitting an instruction from the at least one processor via the communication interface;

generating, by the at least one processor, a first written description of the individual and a second written description of a vehicle associated with the individual, when the vehicle is present, using the at least one image with a trained machine-learning model (MLM) executed by the at least one processor and that processes the at least one image as input and produces as output a type of vehicle when a vehicle is present, the first written description, and the second written description of the vehicle when the vehicle is present to properly associate the order with the individual and enable automated real-time customer identification;

integrating the first written description and the second written description when the vehicle is present into order details associated with the order placed by the individual;

linking the at least one image, the first written description, and the second written description when the vehicle is present, to order details associated with the order based on an order number associated with the order and providing the at least one image, the first written description, and the second written description when the vehicle is present from the at least one processor via the communication interface to the point-of-sale terminal; and verifying at a pickup window and payment window the individual with proper ordered items based on the at least one image, the order details, the first written description and the second written description when the vehicle is present;

wherein the operations are provided and processed by the at least one processor as a cloud-based service to an order manager of the point-of-sale terminal associated with the drive-through lane.

* * * * *